(12) United States Patent
Chu et al.

(10) Patent No.: US 9,374,843 B2
(45) Date of Patent: Jun. 21, 2016

(54) BLUETOOTH-BASED SYSTEM FOR AUTOMATICALLY MATCHING VEHICLE-MOUNTED DEVICE WITH MOBILE PHONE TERMINAL

(71) Applicant: SHENZHEN SEG SCIENTIFIC NAVIGATIONS CO., LTD., Shenzhen, Guangdong (CN)

(72) Inventors: Jialiang Chu, Shenzhen (CN); Wensheng Luo, Shenzhen (CN); Xuanmin Tong, Shenzhen (CN)

(73) Assignee: SHENZHEN SEG SCIENTIFIC NAVIGATIONS CO., LTD., Shenzhen (CN)

( * ) Notice: Subject to any disclaimer, the term of this patent is extended or adjusted under 35 U.S.C. 154(b) by 0 days.

(21) Appl. No.: 14/432,771

(22) PCT Filed: Nov. 8, 2013

(86) PCT No.: PCT/CN2013/086769
§ 371 (c)(1),
(2) Date: Apr. 1, 2015

(87) PCT Pub. No.: WO2015/010389
PCT Pub. Date: Jan. 29, 2015

(65) Prior Publication Data
US 2015/0271858 A1 Sep. 24, 2015

(30) Foreign Application Priority Data
Jul. 26, 2013 (CN) ...................... 2013 2 0451682 U (51) Int. Cl.
| | |
|---|---|
| *H04M 1/00* | (2006.01) |
| *H04W 76/02* | (2009.01) |
| *H04B 5/00* | (2006.01) |
| *H04M 1/725* | (2006.01) |
| *H04W 4/00* | (2009.01) |
| *H04M 1/60* | (2006.01) |
| *H04W 84/18* | (2009.01) |

(52) U.S. Cl.
CPC ........... *H04W 76/023* (2013.01); *H04B 5/0031* (2013.01); *H04M 1/6091* (2013.01); *H04M 1/7253* (2013.01); *H04W 4/008* (2013.01); *H04M 2250/02* (2013.01); *H04W 84/18* (2013.01)

(58) Field of Classification Search
CPC ..... H04W 84/18; H04W 88/06; H04W 76/02; H04M 1/6066; H04M 1/7253; H04M 2250/62; H04M 1/6058; H04M 1/6041; H04M 1/05; H04M 1/6091; H04M 1/6083; H04M 1/6075; B60R 11/0241
USPC ............................................ 455/569.1, 569.2
See application file for complete search history.

(56) References Cited

U.S. PATENT DOCUMENTS

| | | | |
|---|---|---|---|
| 2002/0032042 A1* | 3/2002 | Poplawsky | .......... B60R 11/0241 455/564 |
| 2011/0086678 A1* | 4/2011 | Suzuki | ................ H04M 1/6091 455/569.2 |
| 2011/0117845 A1* | 5/2011 | Kirsch | ................ H04M 1/6091 455/41.2 |

FOREIGN PATENT DOCUMENTS

CN 202798704 U 3/2013

*Primary Examiner* — Ping Hsieh (57) ABSTRACT

The disclosure discloses a Bluetooth-based system for automatically matching a vehicle-mounted device with a mobile phone terminal. The system controls a vehicle-mounted device and a mobile phone terminal to turn on/off their respective Bluetooth function based on a vehicle ignition switch signal. In such a way, the driver needn't to turn on, match, and turn off the Bluetooth functions of the vehicle-mounted device and the mobile phone terminal manually. More intelligentized, convenient and efficient service is provided for the drivers and the power of the mobile phone terminal can be saved.

6 Claims, 5 Drawing Sheets

BLUETOOTH-BASED SYSTEM FOR AUTOMATICALLY MATCHING VEHICLE-MOUNTED DEVICE WITH MOBILE PHONE TERMINAL

FIELD

The present application relates to a technical field of vehicle communication, more specifically, relates to a Bluetooth-based system for automatically matching a vehicle-mounted device with a mobile phone terminal.

BACKGROUND

When driving vehicles, drivers often face problems of making or answering phones. They may miss emergent and important events if they don't make or answer the phones. However, the drivers will move their hands away from the steering wheels if they do so, which make the drivers fail to concentrate on driving and bring the hidden danger to traffic safety. Regarding such security issues, a vehicle-mounted Bluetooth function is configured in vehicles or navigators to support hands-free phoning and texting at present. However, in order to save power, most of drivers turn off the Bluetooth function of the mobile phone in normal times, and usually forget to or are not disposed to turn on the Bluetooth function of the mobile phone due to various reasons. Thus, the mobile phone can't match and communicate with a vehicle-mounted phone or other vehicle-mounted devices timely through the Bluetooth function, which makes the applications (e.g. Bluetooth earpiece, the transmission of the Bluetooth audio-video files, the update of programs or dates), which need to use the Bluetooth function to transmit. Bluetooth data between the mobile phone and the vehicle-mounted unavailable. A Chinese utility model No. CN202798704U, titled AUTOMATICALLY MATCHING DEVICE OF VEHICLE-MOUNTED MOBILE PHONE BLUETOOTH, discloses a device that judges whether a Bluetooth function of a mobile phone in a vehicle is turned on by locating and monitoring the mobile phone in the vehicle, so as to accurately search and match the mobile phone Bluetooth in the vehicle. However, the device is used based on the fact that the SIM card of the mobile phone is replaced by a RFID-SIM card, so that the automatically matching of the vehicle-mounted mobile phone Bluetooth can be implemented by reading the information in the RFID-SIM card. What is more, a radio frequency identification unit and a RFID information reading unit should be further provided for the device. Thus, the device is difficult to be popularized and spread.

SUMMARY

To solve the drawbacks in prior art, the present application provides a Bluetooth-based system for automatically matching a vehicle-mounted device with a mobile phone terminal. Through the system, power consumption of the mobile phone terminal can be saved, and the drivers needn't to turn on, search, match, connect, disconnect and turn off the Bluetooth function of the vehicle-mounted device and that of the mobile phone terminal manually. Additionally, the mobile phone terminal with any kind of SIM card is suitable for the system, so that the SIM card of the mobile phone terminal does not need to be replaced.

According to one aspect, a Bluetooth-based system for automatically matching a vehicle-mounted device with a mobile phone terminal is provided, which comprises a vehicle-mounted device, a remote server and a mobile phone terminal.

In which, the vehicle-mounted device includes a processing module, a wireless communication module, a vehicle-mounted Bluetooth module and an ignition switch port. The processing module is connected to the ignition switch port, the wireless communication module and the vehicle-mounted Bluetooth module respectively and configured to obtain an ignition switch port signal, and to control the vehicle-mounted Bluetooth module to turn on or turn off its Bluetooth function, and further to communicate with the remote server through the wireless communication module so as to control the mobile phone terminal to turn on or turn off its Bluetooth function. The wireless communication module is configured to communicate with the remote server over a mobile network. The vehicle-mounted Bluetooth module is configured to establish a Bluetooth communication with the mobile phone terminal.

The remote server is communicatively connected to the vehicle-mounted device and the mobile phone terminal over the mobile network.

The mobile phone terminal responds a signal from the remote server to turn on/off the Bluetooth function and automatically matches the vehicle-mounted Bluetooth module when its Bluetooth function is turned on.

In the Bluetooth-based system for automatically matching a vehicle-mounted device with a mobile phone terminal according to the present application, wherein, the ignition switch port includes a CAN transceiver which connected with the ignition switch via a CAN bus. When the ignition switch switches from "LOCK" to "ACC", then a turning on signal is generated. When the ignition switch switches from "ACC" to "LOCK", then a turning off signal is generated.

In the Bluetooth-based system for automatically matching a vehicle-mounted device with a mobile phone terminal according to the present application, wherein, the processing module includes a microprocessor, a storage and a DSP chip.

The microprocessor is connected to the wireless communication module, the vehicle-mounted Bluetooth module, the CAN transceiver, the storage and the DSP chip.

The storage is configured to store Bluetooth information at least including names for Bluetooth devices in the vehicle-mounted Bluetooth module and the mobile phone terminal.

The DSP chip is connected to the vehicle-mounted Bluetooth module, and is further connected to a microphone, a power amplifier and the microprocessor respectively.

In the Bluetooth-based system for automatically matching a vehicle-mounted device with a mobile phone terminal according to the present application, the Bluetooth information at least includes names for Bluetooth devices in the vehicle-mounted Bluetooth module and the mobile phone terminal.

In the Bluetooth-based system for automatically matching a vehicle-mounted device with a mobile phone terminal according to the present application, wherein, the remote server includes a remote storage for storing a mobile number of the mobile phone terminal.

In the Bluetooth-based system for automatically matching a vehicle-mounted device with a mobile phone terminal according to the present application, wherein, the remote server is connected to the wireless communication module of the vehicle-mounted device and the mobile phone terminal through a 2G mobile network, a 2.5G mobile network, a 2.75G mobile network, a 3G mobile network or a 4G mobile network.

In the Bluetooth-based system for automatically matching a vehicle-mounted device with a mobile phone terminal according to the present application, wherein, an application is installed in the mobile phone terminal for turning on/off the Bluetooth function automatically. The application turns on the Bluetooth function of the mobile phone terminal via the remote server, and matches the mobile phone terminal with the vehicle-mounted Bluetooth module automatically, and turns off the Bluetooth function of the mobile phone terminal when the mobile phone terminal fails to match the vehicle-mounted Bluetooth module.

In the Bluetooth-based system for automatically matching a vehicle-mounted device with a mobile phone terminal according to the present application, the vehicle-mounted device further includes an answering/disconnecting key and a voice inputting/outputting module.

The answering/disconnecting key is configured to control an answering/disconnecting function of the mobile phone terminal and the voice inputting/outputting module is configured to replace a voice inputting/outputting function of the mobile phone terminal.

In the Bluetooth-based system for automatically matching a vehicle-mounted device with a mobile phone terminal according to the present application, the answering/disconnecting key is mounted on a steering wheel.

In the Bluetooth-based system for automatically matching a vehicle-mounted device with a mobile phone terminal according to the present application, the answering/disconnecting key includes a key and an encoder for distinguishing each action of the key.

The key is connected to the microprocessor through the encoder.

The microprocessor is further configured to detect an answering/disconnecting state when the answering/disconnecting key is pressed.

In the Bluetooth-based system for automatically matching a vehicle-mounted device with a mobile phone terminal according to the present application, the voice inputting/outputting module includes a microphone, a power amplifier and a loudspeaker.

The power amplifier is connected to the microprocessor and the loudspeaker respectively.

In the Bluetooth-based system for automatically matching a vehicle-mounted device with a mobile phone terminal according to the present application, the vehicle-mounted device is further connected to a vehicle-mounted phone.

When implementing the Bluetooth-based system for automatically matching a vehicle-mounted device with a mobile phone terminal of the present application, the following advantageous effects can be achieved. The vehicle-mounted device accurately controls the Bluetooth function of the mobile phone terminal through the vehicle ignition switch signal, so that the Bluetooth of the mobile phone can match the vehicle-mounted Bluetooth automatically. In this way, problem that most of drivers turn off the Bluetooth function of the mobile phone in normal times for saving power thus forget to or are not disposed to turn on the Bluetooth function of the mobile phone due to various reasons, can be solved. Therefore, more intelligentized, convenient and efficient service is provided for the drivers.

BRIEF DESCRIPTION

The present application will be further described with reference to the accompanying drawings and embodiments in the following, in the accompanying drawings.

DETAILED DESCRIPTION

To make the objects, technical schemes and advantages more clearly, the present application may be further described in detail with reference to the accompanying drawings and embodiments.

Figure 1:
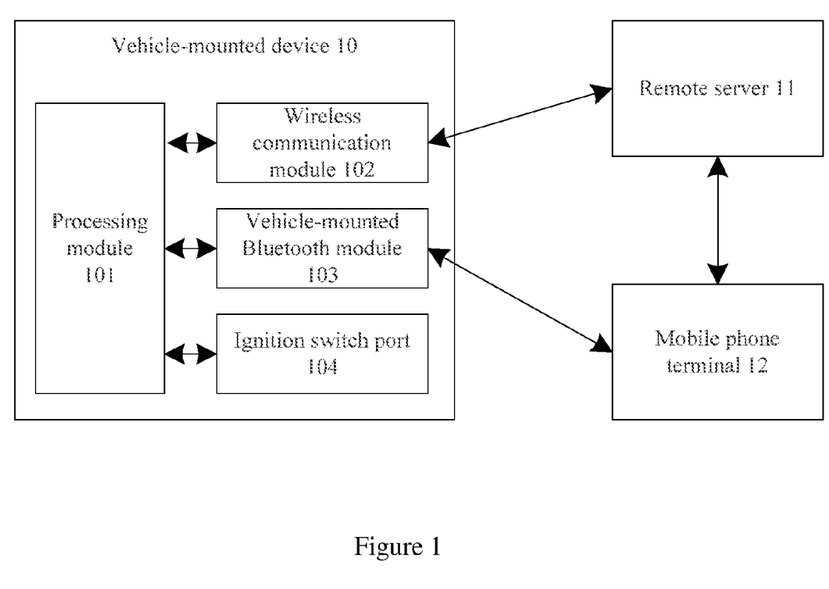
FIG. 1 is a block diagram of a Bluetooth-based system for automatically matching a vehicle-mounted device with a mobile phone terminal according to the present application.

Referring to FIG. 1, a block diagram of a Bluetooth-based system for automatically matching a vehicle-mounted device with a mobile phone terminal according to the present application is shown. The system controls a vehicle-mounted device 10 and a mobile phone terminal 12 to turn on/off their respective Bluetooth functions based on a vehicle ignition switch signal. When a turning on signal is sent by an ignition switch, the Bluetooth function of the vehicle-mounted device 10 is turned on, and the Bluetooth function of the mobile phone terminal 12 is turned on via a remote server 11. In this way, the Bluetooth of the mobile phone terminal 12 can automatically match the vehicle-mounted Bluetooth. When a turning off signal is sent by the ignition switch, the Bluetooth functions of the vehicle-mounted device 10 and the mobile phone terminal 12 are turned off automatically.

The system comprises the vehicle-mounted device 10, the remote server 11 and the mobile phone terminal 12. The vehicle-mounted device 10 includes a processing module 101, a wireless communication module 102, a vehicle-mounted Bluetooth module 103 and an ignition switch port 104.

The processing module 101 is connected to the ignition switch port 104, the wireless communication module 102 and the vehicle-mounted Bluetooth module 103 respectively. The processing module 101 is configured to control the vehicle-mounted Bluetooth module 103 to turn on/off the Bluetooth function based on the turning on/off signal from the ignition switch, and to generate a control signal according to the turning on signal and the Bluetooth information of the vehicle-mounted Bluetooth module 103 while the turning on signal is sent out by the ignition switch.

The ignition switch port 104 is configured to receive and respond the vehicle ignition switch signal. Specifically, the ignition switch port 104 is configured to receive and respond the vehicle ignition switch signal through the CAN or wire communication. When the ignition switch is switched from "LOCK" to "ACC", the turning on signal is generated. When the ignition switch is switched from "ACC" to "LOCK", the turning off signal is generated.

The wireless communication module 102 is configured to transmit the control signal to the remote server 11 over the mobile network.

The vehicle-mounted Bluetooth module 103 is configured to establish a Bluetooth matching relationship with the mobile phone terminal 12. Specifically, the Bluetooth information of the mobile phone terminal 12 at least includes a Bluetooth device name. Additionally, the vehicle-mounted Bluetooth module 103 is further configured to store the Bluetooth information of the mobile phone terminal 12 which at least including the Bluetooth device name.

The remote server 11 is configured to control the mobile phone terminal 12 to turn on the Bluetooth function over the mobile network based on the control signal. Specifically, the remote server 11 is connected to the wireless communication module 102 of the vehicle-mounted device 10 and the mobile phone terminal 12 through the 2G mobile network, the 2.5G mobile network, the 2.75G mobile network, the 3G mobile network or the 4G mobile network. The remote server 11 further includes a remote storage which stores the mobile number of the mobile phone terminal 12, the Bluetooth device name and so on.

The mobile phone terminal 12 is configured to turn on/off the Bluetooth function automatically and to match the vehicle-mounted Bluetooth module 103 automatically when the Bluetooth function is turned on. Specifically an application automatically turning on/off the Bluetooth function is installed in the mobile phone terminal 12. The application turns on the Bluetooth function of the mobile phone terminal 12 used on the control of the remote server 11, and matches the vehicle-mounted Bluetooth module 103 automatically. In addition, the application turns off the Bluetooth function of the mobile phone terminal 12 when the mobile phone terminal 12 fails to match the vehicle-mounted Bluetooth module 103.

Figure 2:
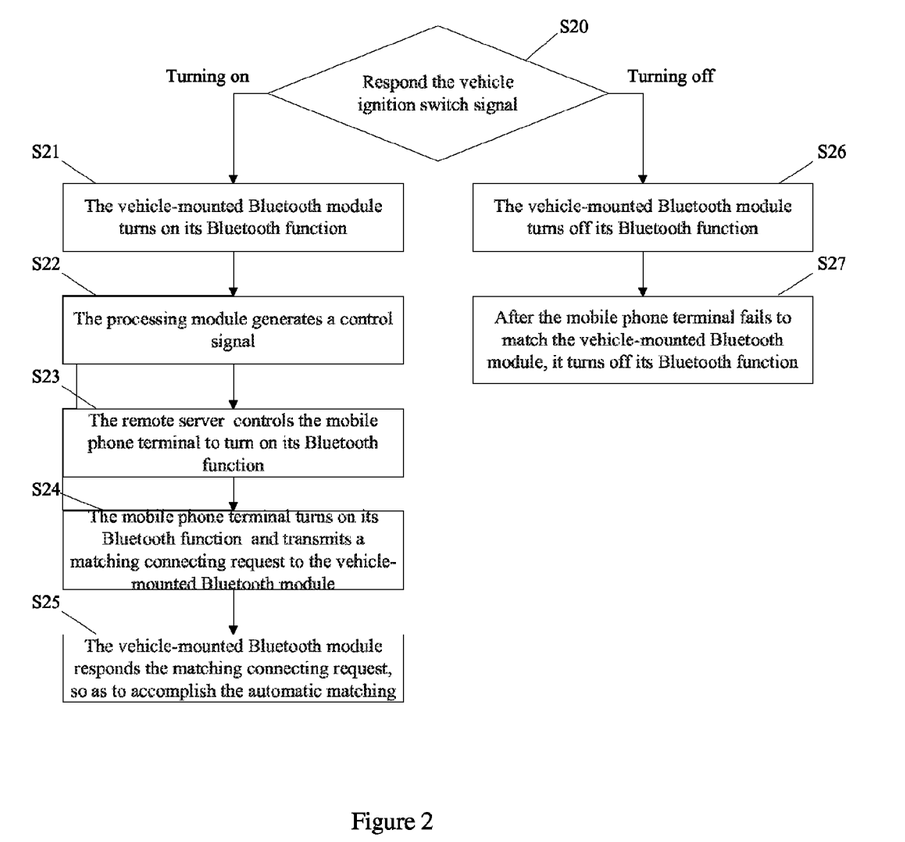
FIG. 2 is a diagram of a Bluetooth-based automatically matching process between the vehicle-mounted device and the mobile phone terminal according to the present application.

Referring to FIG. 2, a schematic of a Bluetooth-based automatically matching process between the vehicle-mounted device and the mobile phone terminal according to the present application is shown. The match processing comprises the following steps.

In step S20, the vehicle-mounted device 10 receives the vehicle ignition switch signal through the ignition switch port 104. Then steps S21-S25 are implemented if the vehicle ignition switch signal is a turning on signal, and steps S26-S27 are implemented if the vehicle ignition switch signal is a turning off signal. Specifically, when the ignition switch is switched from "LOCK" to "ACC", the turning on signal is generated. When the ignition switch is switched from "ACC" to "LOCK", the turning off signal is generated.

In step S21, the vehicle-mounted Bluetooth module 103 turns on the Bluetooth function.

In step S22, the processing module 101 generates a control signal according to the vehicle ignition switch signal and the Bluetooth signal of the vehicle-mounted Bluetooth module 103, and controls the wireless communication module 102 to transmit the control signal to the remote server 11 over the mobile network.

In step S23, the remote server 11 controls the mobile phone terminal 12 to turn on the Bluetooth function over the mobile network based on the control signal. Specifically, the remote server 11 is connected to the wireless communication module 102 of the vehicle-mounted device 10 and the mobile phone terminal 12 through the 2G mobile network, the 2.5G mobile network, the 2.75G mobile network, the 3G mobile network or the 4G mobile network.

In step S24, the mobile phone terminal 12 turns on the Bluetooth function automatically, and transmits a matching connecting request to the vehicle-mounted Bluetooth module 103. Specifically, the step S24 further includes following steps.

In step S241, the mobile phone terminal 12 turns on the Bluetooth function automatically.

In step S242, the mobile phone terminal 12 transmits the matching connecting request to the vehicle-mounted Bluetooth module 103 based on the Bluetooth information of the vehicle-mounted Bluetooth module 103. Wherein, the Bluetooth information includes the Bluetooth device name.

In step S25, the vehicle-mounted Bluetooth module 103 responds the matching connecting request from the mobile phone terminal 12, so as to accomplish the automatic matching and connecting. Specifically, the step S25 further includes following steps.

In step S251, the storage 302 pre-stores the Bluetooth information of the mobile phone terminal 12.

In step S252, the vehicle-mounted Bluetooth module 103 responds the matching connecting request from the mobile phone terminal 12 based on the Bluetooth information of the mobile phone terminal 12, so as to accomplish the automatic matching.

In step S26, the vehicle-mounted Bluetooth module 103 turns off the Bluetooth function.

In Step S27, the mobile phone terminal 12 is disconnected from the vehicle-mounted Bluetooth module 103, and the Bluetooth function of the mobile phone terminal 12 is turned off.

Figure 3:
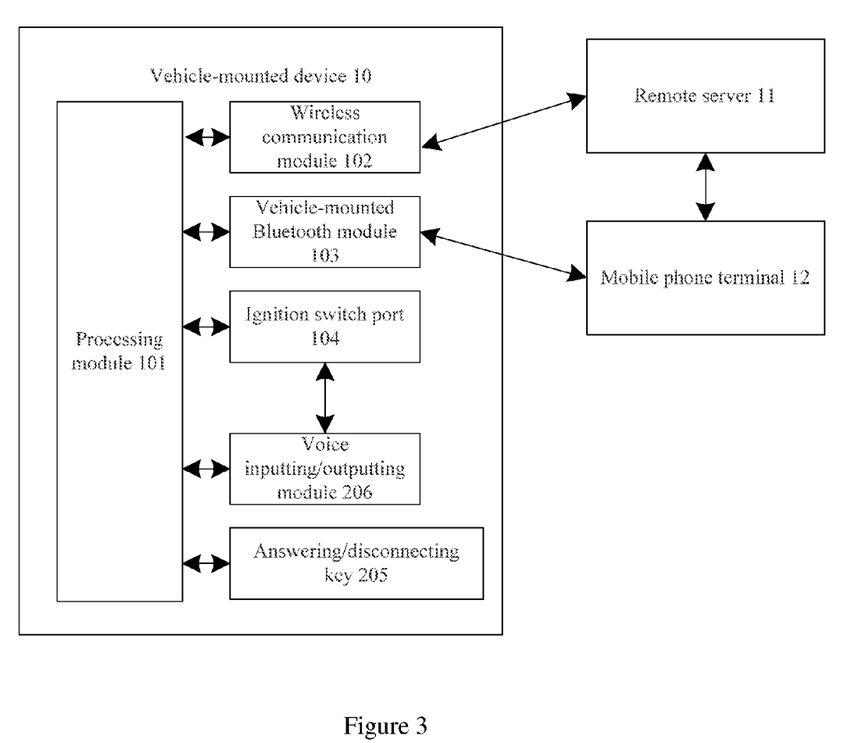
FIG. 3 is a block diagram of a system for answering/disconnecting a phone by one key according to a first embodiment of the present application.

FIG. 3 shows a block diagram of a system for answering/disconnecting a phone by one key according to the first embodiment of the present application. In which, the driver can answer/disconnect a phone by one key while driving after the Bluetooth of the mobile phone terminal 12 and the Bluetooth of the vehicle-mounted device 10 are matched with each other.

The system comprises the vehicle-mounted device 10, the remote server 11 and the mobile phone terminal 12. The vehicle-mounted device 10 includes the processing module 101, the wireless communication module 102, the vehicle-mounted Bluetooth module 103, the ignition switch port 104, an answering/disconnecting key 205 and a voice inputting/outputting module 206.

The processing module 101 is connected to the ignition switch port 104, the wireless communication module 102 and the vehicle-mounted Bluetooth module 103 respectively. The processing module 101 is configured to control the vehicle-mounted Bluetooth module 103 to turn on/off the Bluetooth function based on the turning on/off signal from the ignition switch, and to generate a control signal according to the turning on signal and the Bluetooth information of the vehicle-mounted Bluetooth module 103 while the turning on signal is sent by the ignition switch. Specifically, the processing module 101 includes a microprocessor 301, the storage 302 and a DSP chip 306.

The microprocessor 301 is connected to the wireless communication module 102, the vehicle-mounted Bluetooth module 103, the CAN transceiver 303, the storage 302 and the DSP chip 306. The microprocessor 301 is configured to generate the control signal based on the Bluetooth information and the turning on signal of the ignition switch 321, and to control the mobile phone terminal 12 to turn on Bluetooth function through the remote server 11.

The storage 302 is configured to store the Bluetooth information which at least includes the Bluetooth device name of the vehicle-mounted Bluetooth module 102 and the Bluetooth device name of the mobile phone terminal 12.

The DSP chip 306 is connected to the vehicle-mounted Bluetooth module 103 for converting the signal from digital to analog, or from analog to digital.

The ignition switch port 104 is configured to respond the vehicle ignition switch signal. Specifically, the ignition switch port 104 is configured to receive the vehicle ignition switch signal through CAN or wire communication. When the ignition switch is switched from "LOCK" to "ACC", the turning on signal is generated. When the ignition switch is switched from "ACC" to "LOCK", the turning off signal is generated.

The wireless communication module 102 is configured to transmit the control signal to the remote server 11 over the mobile network. The remote server 11 further includes the remote storage.

The remote storage is configured to store the mobile number of the mobile phone terminal.

The vehicle-mounted Bluetooth module 103 is configured to establish a Bluetooth matching with the mobile phone terminal 12. Specifically, the Bluetooth information of the mobile phone terminal 12 at least includes a Bluetooth device name. Additionally, the vehicle-mounted Bluetooth module 103 is further configured to store the Bluetooth information of the mobile phone terminal 12, and the Bluetooth information includes the Bluetooth device name at least.

The remote server 11 is configured to control the mobile phone terminal 12 to turn on the Bluetooth function over the mobile network based on the control signal. Specifically, the remote server 11 is connected to the wireless communication module 102 of the vehicle-mounted device 10 and the mobile phone terminal 12 through the 2G mobile network, the 2.5G mobile network, the 2.75G mobile network, the 3G mobile network or the 4G mobile network.

The mobile phone terminal 12 is configured to turn on/off the Bluetooth function automatically and to match the vehicle-mounted Bluetooth module 103 automatically when the Bluetooth function is turned on. Specifically, an application is installed in the mobile phone terminal 12 for turning on/off the Bluetooth function automatically. The application turns on the Bluetooth function of the mobile phone terminal 12 based on the control of the remote server 11, and matches the vehicle-mounted Bluetooth module 103 automatically. In addition, the application turns off the Bluetooth function of the mobile phone terminal 12 if the mobile phone terminal 12 fails to match the vehicle-mounted Bluetooth module 103.

The answering/disconnecting key 205 is configured to control the answering/disconnecting function of the mobile phone terminal through one key. The answering/disconnecting key 205 can be mounted on a steering wheel, so as to provide easy operation for the driver. Specifically, the answering/disconnecting key 205 includes a key 305 and an encoder 304.

The key 305 is connected to the microprocessor 301 through the encoder 304.

The voice inputting/outputting module 206 is configured to replace the voice inputting/outputting functions of the mobile phone terminal. Specifically, the voice inputting/outputting module 206 includes a microphone 307, a power amplifier 308 and a loudspeaker 309.

The power amplifier 308 is connected to the microprocessor 301 and the loudspeaker 309 respectively.

This embodiment has advantages of easy operation and safe, such that the driver doesn't need to move their hands away from the steering wheel to answer and disconnect phones.

Figure 4:
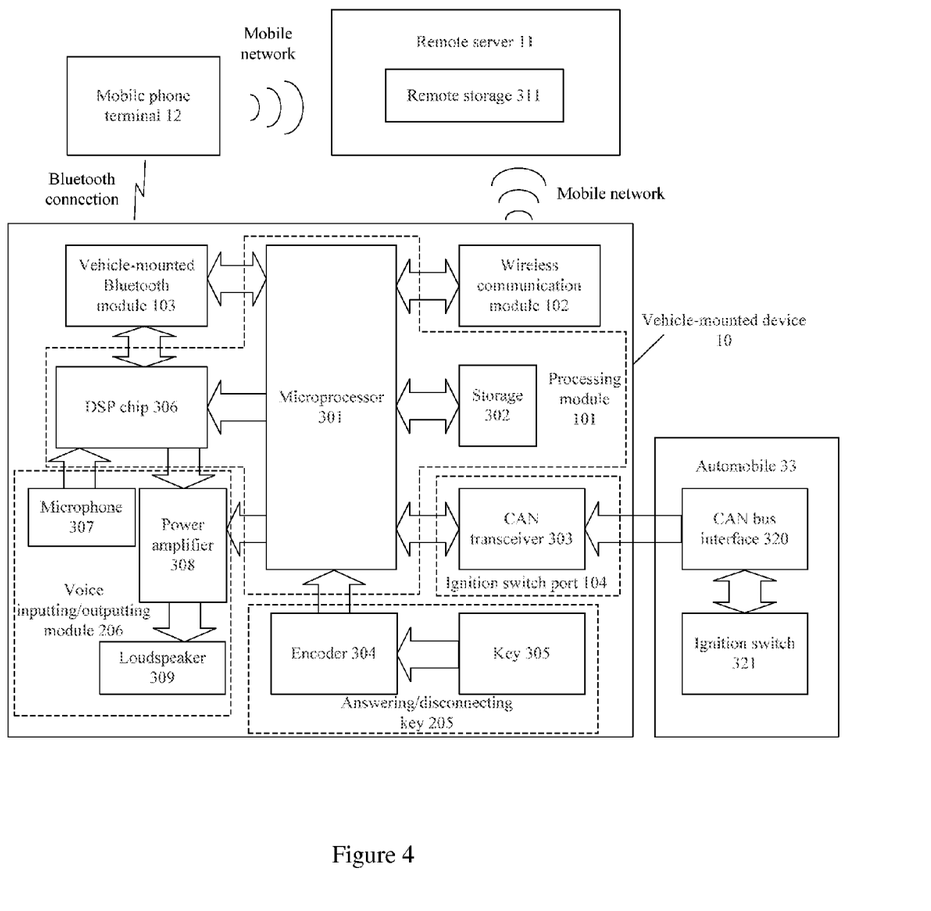
FIG. 4 is a hardware block diagram of the system for answering/disconnecting a phone by one key according to a first embodiment of the present application.

FIG. 4 shows a hardware principle structure view of the system for answering/disconnecting the phone by one key according to the first embodiment of the present application. The system comprises the vehicle-mounted device 10, the remote server 11 and the mobile phone terminal 12. The vehicle-mounted device 10 includes the processing module 101, the wireless communication module 102, the vehicle-mounted Bluetooth module 103, the ignition switch port 104, the answering/disconnecting key 205 and the voice inputting/outputting module 206.

The processing module 101 is connected to the ignition switch port 104, the wireless communication module 102, the vehicle-mounted Bluetooth module 103 and the DSP chip respectively.

The ignition switch port 104 is configured to respond the vehicle ignition switch signal.

The wireless communication module 102 is configured to transmit the control signal to the remote server 11 over the mobile network.

The vehicle-mounted Bluetooth module 103 is configured to establish a Bluetooth matching with the mobile phone terminal 12.

The processing module 101 includes the microprocessor 301, the storage 302 and thuds chip 306. Wherein, the microprocessor 301 is connected to the wireless communication module 102, the vehicle-mounted Bluetooth module 103, the transceiver 303, the storage 302 and the DSP chip 306. The microprocessor 301 is configured to generate the control signal based on the Bluetooth information and the turning on signal from the ignition switch 321, and to control the mobile phone terminal 12 to turn on Bluetooth function through the remote server 11. Wherein, the storage 302 is configured to store the Bluetooth information which at least includes the Bluetooth device name of the vehicle-mounted Bluetooth module 102 and the Bluetooth device name of the mobile phone terminal 12. The DSP chip 306 is connected to the vehicle-mounted Bluetooth module 103 for converting the signal from digital to analog, or from analog to digital. The answering/disconnecting key 205 is configured to control the answering/disconnecting function of the mobile phone terminal through one key. The answering/disconnecting key 205 can be mounted on the steering wheel, so as to provide easy operation for the driver. Specifically, the answering/disconnecting key 205 includes the key 305 and the encoder 304. The key 305 is connected to the microprocessor 301 through the encoder 304. The encoder 304 is configured to distinguish each action of the key 305.

The more the circuit output lines the encoder 304 has, the more codes the encoder can encode, thus the more input lines the encoder can distinguish. For example, at least one circuit output line is needed if the answering/disconnecting key 205 has two actions of answering and disconnecting. When the vehicle-mounted device 10 is answering a phone, the phone will be disconnected if the answering/disconnecting key 205 is pressed. When the vehicle-mounted device 10 is disconnected, a phone will be answered if the answering/disconnecting key 205 is pressed again. When the answering/disconnecting key 205 is pressed, the processing module 101 needs to detect the actual answering/disconnection state, so as to accurately read the signal sent from the encoder 304.

The voice inputting/outputting module 206 is configured to replace the voice inputting/outputting functions of the mobile phone terminal 12. Specifically, the voice inputting/outputting module 206 includes the microphone 307, the power amplifier 308 and the loudspeaker 309.

The power amplifier 308 is connected to the microprocessor 301 and the loudspeaker 309 respectively for amplifying the voice signals output from the microprocessor 301 and then outputting the voice signals.

The remote server 11 is configured to control the mobile phone terminal 12 to turn on the Bluetooth function over the mobile network based on the control signal.

The mobile phone terminal 12 is configured to turn on off the Bluetooth function automatically, and to match the vehicle-mounted Bluetooth module 103 when the Bluetooth function is turned on.

The present application will be illustrated through describing the working process of the system with aforementioned structure.

Firstly, the vehicle-mounted device 10 starts the microprocessor 301 of the processing module 101, so that the microprocessor 301 is connected to a CAN bus interface 320 of a vehicle 33 through the CAN transceiver 303 of the ignition switch port 104. The microprocessor 301 then receives the turning on signal from the ignition switch 321, and turns on the Bluetooth function of the vehicle-mounted Bluetooth module 103. Meanwhile, the microprocessor 301 calls the blue device names of the vehicle-mounted Bluetooth module 103 and the mobile phone terminal 12, and generates a control signal, then transmits the control signal to the remote server 11 through the wireless communication module.

Secondly, the remote server 11 calls information stored in the remote storage 311, and transmits the control signal to the corresponding mobile phone terminal 12 for turning on its Bluetooth device. When the ignition switch 321 sends a turning on signal, the Bluetooth function of the vehicle-mounted device 10 is turned on and the Bluetooth function of the mobile phone terminal 12 is turned on via the remote server 11, so that the Bluetooth of the mobile phone terminal 12 can match the Bluetooth of the vehicle-mounted device.

Then, the mobile phone terminal 12 transmits a Bluetooth matching request to the vehicle-mounted Bluetooth module 103 based on the Bluetooth information contained in the control signal, and waits for the respond from the vehicle-mounted device 10. After that, the microprocessor 301 calls the information about the mobile phone terminal 12 stored in the storage 302 and responds the matching request to accomplish the matching process.

After the matching process, the driver can use one key to answer/disconnect the mobile phone terminal 12 through the vehicle-mounted device.

When a call is coming, the driver can answer the phone by pressing the answering/disconnecting key 205. Voice signals from the driver are received by the microphone 307 and then transmitted to the DSP chip 306. After that, the voice signals are converted to digital signals through the A/D conversion by the DSP chip 306. The converted signals are processed by the microprocessor 301 and then transmitted to the vehicle-mounted Bluetooth module 103, so that they can be transmitted to the mobile phone terminal 12 through the Bluetooth. Responding voice signals are transmitted to the vehicle-mounted Bluetooth module 103 through the Bluetooth by the mobile phone terminal 12. The responding voice signals are converted to analog signals through the D/A conversion by the DSP chip 306. The converted signal is sent to the power amplifier 308 and then amplified therein. Finally, the amplified signal is outputted by the loudspeaker 309. The phone will be disconnected if the driver presses the answering/disconnecting key 205 again.

On the other hand, the Bluetooth function of the vehicle-mounted Bluetooth module 103 is turned off when the turning off signal is sent by the ignition switch. The Bluetooth function of the mobile phone terminal 12 is turned off automatically after the Bluetooth of the mobile phone terminal 12 fails to match the Bluetooth of the vehicle-mounted device 10.

In the system, the vehicle-mounted device 10 and the mobile phone terminal 12 can be updated through the remote server 11, so that more friendly services can be provided based on the users' habits. The hardware of the system can be updated also, for example, a touch screen can be added at the vehicle-mounted device and is mounted on a location that is easy for the driver to operate. Thus, more intelligentized, convenient and efficient service is provided for the driver.

Figure 5:
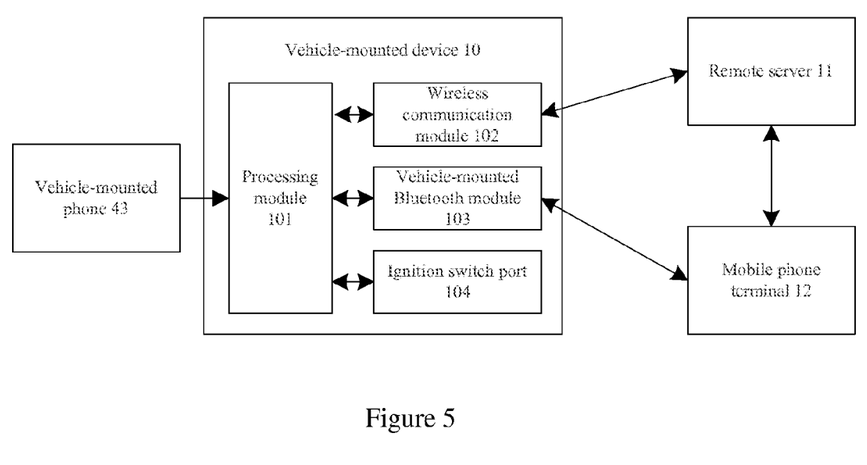
FIG. 5 is a block diagram of a system for connecting a vehicle-mounted mobile phone according to a second embodiment of the present application.

FIG. 5 shows a block diagram of a system for connecting a vehicle-mounted mobile phone according to the second embodiment of the present application. In the system, the vehicle-mounted device is connected to an original vehicle-mounted phone, and the driver can transfer the phone from the mobile phone terminal to the vehicle-mounted phone after the Bluetooth of the mobile phone terminal 12 and the Bluetooth of the vehicle-mounted device 10 are matched.

The system comprises the vehicle-mounted device 10, the remote server 11, the mobile phone terminal 12, the vehicle-mounted phone 43, and a vehicle-mounted device connecting processing module 101, the wireless communication module 102, the vehicle-mounted Bluetooth module 103 and the ignition switch port 104.

The processing module 101 is connected to the ignition switch port 104, the wireless communication module 102 and the vehicle-mounted Bluetooth module 103 respectively. The processing module 101 is configured to control the vehicle-mounted Bluetooth module 103 to turn on/off the Bluetooth function based on the turning on/off signal from the ignition switch, and to generate a control signal according to the turning on signal and the Bluetooth information of the vehicle-mounted Bluetooth module 103 while the ignition switch sends out the turning on signal.

The ignition switch port 104 is configured to receive and respond the vehicle ignition switch signal. Specifically, the ignition switch port 104 is configured to receive the vehicle ignition switch signal through CAN or wire communication. When the ignition switch is switched from "LOCK" to "ACC", the turning on signal is generated. When the generating ignition switch is switched from "ACC" to "LOCK", the turning off signal is generated.

The wireless communication module 102 is configured to transmit the control signal to the remote server 11 over the mobile network.

The vehicle-mounted Bluetooth module 103 is configured to establish a Bluetooth matching relationship with the mobile phone terminal 12. Specifically, the Bluetooth information of the mobile phone terminal 12 at least includes a Bluetooth device name. Additionally, the vehicle-mounted Bluetooth module 103 is further configured to store the Bluetooth information of the mobile phone terminal 12 which at least including the Bluetooth device name.

The remote server 11 is configured to control the mobile phone terminal 12 to turn on the Bluetooth function over the mobile network based on the control signal.

The mobile phone terminal 12 is configured to turn on off the Bluetooth function automatically and to match the vehicle-mounted Bluetooth module 103 automatically when the Bluetooth function is turned on. Specifically, an application automatically turning on/off the Bluetooth function is installed in the mobile phone terminal 12. The application turns on the Bluetooth function of the mobile phone terminal 12 based on the control of the remote server 11, and matches the vehicle-mounted Bluetooth module 103 automatically. The application turns off the Bluetooth function of the mobile phone terminal 12 when the mobile phone terminal 12 fails to match the vehicle-mounted Bluetooth module 103.

The vehicle-mounted phone 43 connected to the vehicle-mounted device 10 is configured to transfer the mobile phone to the vehicle-mounted phone 43 after the vehicle-mounted Bluetooth matches the mobile phone Bluetooth.

The present embodiment has an advantage that the original phone system is used, so that a voice input/output module is needless and economic costs is reduced.

While the present application has been described with reference to preferred embodiments, however, the present application is not limited to above-mentioned embodiments, those modifications, improvements and equivalent substitutions, which don't depart from the scope of the spirit and the principle of the present application, should be included within the scope of the present application.

What is claimed is:

1. A Bluetooth-based system for automatically matching a vehicle-mounted device with a mobile phone terminal, comprising a vehicle-mounted device (10), a remote server (11) and a mobile phone terminal (12);
    wherein, the vehicle-mounted device (10) includes a processing module (101), a wireless communication module (102) for communicating with the remote server (11) over a mobile network, a vehicle-mounted Bluetooth module (103) for establishing a Bluetooth communication with the mobile phone terminal (12), and an ignition switch port (104); wherein the processing module (101) is connected to the ignition switch port (104), the wireless communication module (102) and the vehicle-mounted Bluetooth module (103) respectively, so as to obtain an ignition switch port signal and control the vehicle-mounted Bluetooth module (102) to turn on or turn off its Bluetooth function and control the mobile phone terminal (12) to turn on or turn off its Bluetooth function by communicating with the remote server (11) through the wireless communication module (102);
    wherein the remote server (11) is communicatively connected to the vehicle-mounted device (10) and the mobile phone terminal (12) over the mobile network; and
    the mobile phone terminal (12) responds a signal from the remote server (11) to turn on/off its Bluetooth function and automatically matches the vehicle-mounted Bluetooth module (103) when its Bluetooth function is turned on;
    the ignition switch port (104) includes a CAN transceiver (303) and a CAN bus interface (303), the ignition switch port (104) is connected to an ignition switch (321) through the CAN bus interface (303), when the ignition switch (321) switches from "LOCK" to "ACC", a turning on signal is generated, and when the ignition switch (321) switches from "ACC" to "LOCK", a turning off signal is generated;
    the processing module (101) includes a microprocessor (301), a storage (302) and a DSP chip (306);
    wherein the microprocessor (301) is connected to the wireless communication module (102), the vehicle-mounted Bluetooth module (103), the CAN transceiver (303), the storage (302) and the DSP chip (306), and is configured to generate a control signal based on Bluetooth information and the turning on signal from the ignition switch (321) and to control the mobile phone terminal (12) to turn on its Bluetooth function by the remote server (11);
    wherein the storage (302) is configured to store the Bluetooth information which at least includes Bluetooth device names of the vehicle-mounted Bluetooth module and the mobile phone terminal;
    wherein the DSP chip (306) is connected to the vehicle-mounted Bluetooth module (103);
    the remote server (11) includes a remote storage (311) for storing a mobile number of the mobile phone terminal (12) and the Bluetooth device name of the vehicle-mounted Bluetooth module (102);
    the mobile phone terminal (12) turns on its Bluetooth function automatically after receiving a control signal from the remote server (11), and matches the vehicle-mounted Bluetooth module (103) automatically; and the mobile phone terminal (12) turns off its Bluetooth function automatically when the vehicle-mounted Bluetooth module (103) turns off its Bluetooth function.

2. The system according to claim 1, wherein, the vehicle-mounted device further includes an answering/disconnecting key (205) connecting the processing module (101) and a voice inputting/outputting module (206) connecting the vehicle-mounted Bluetooth module (103).

3. The system according to claim 2, wherein, the answering/disconnecting key (205) for controlling the answering/disconnecting function of the mobile phone terminal is mounted on a steering wheel.

4. The system according to claim 2, wherein, the answering/disconnecting key (205) includes a key (305) and an encoder (304) for distinguishing each action of the key (305) which is connected to the microprocessor (301) through the encoder (304), wherein the microprocessor (101) is further configured to detect the answering/disconnecting state when the answering/disconnecting key (305) is pressed.

5. The system according to claim 2, wherein, the voice inputting/outputting module (206) includes a microphone (307), a power amplifier (308) and a loudspeaker (309), wherein the power amplifier (308) is connected to the microprocessor (301), the DSP chip (306) and the loudspeaker (309) respectively, and the microphone (307) is connected to the DSP chip (306).

6. The system according to claim 2, wherein, the vehicle-mounted device (10) is further connected to a vehicle-mounted phone (43).

* * * * *